(No Model.) 3 Sheets—Sheet 1.
A. C. CAMPBELL.
MECHANICAL MOVEMENT.
No. 298,943. Patented May 20, 1884.
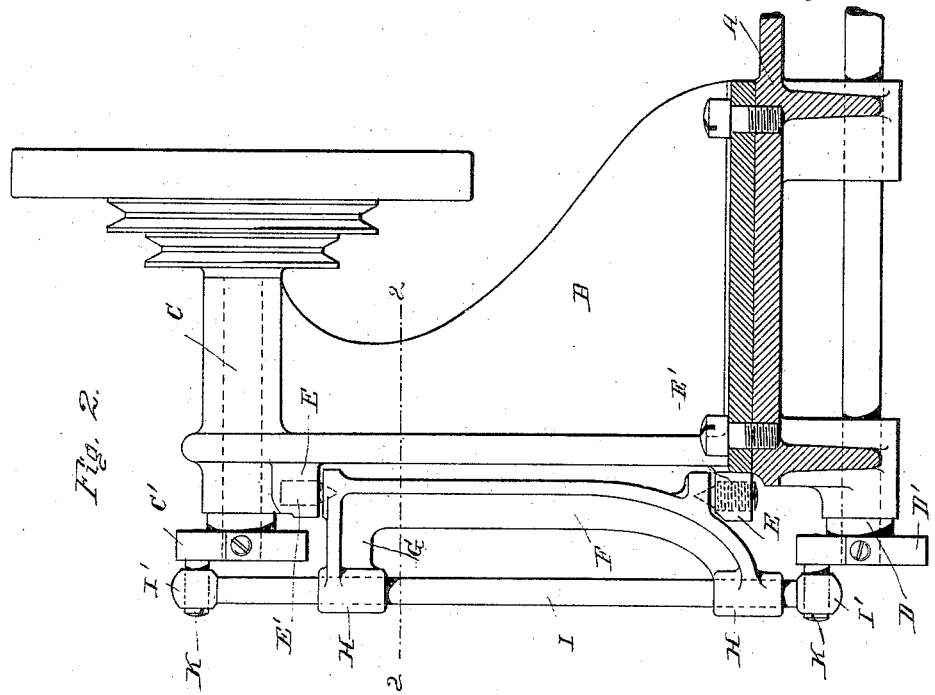
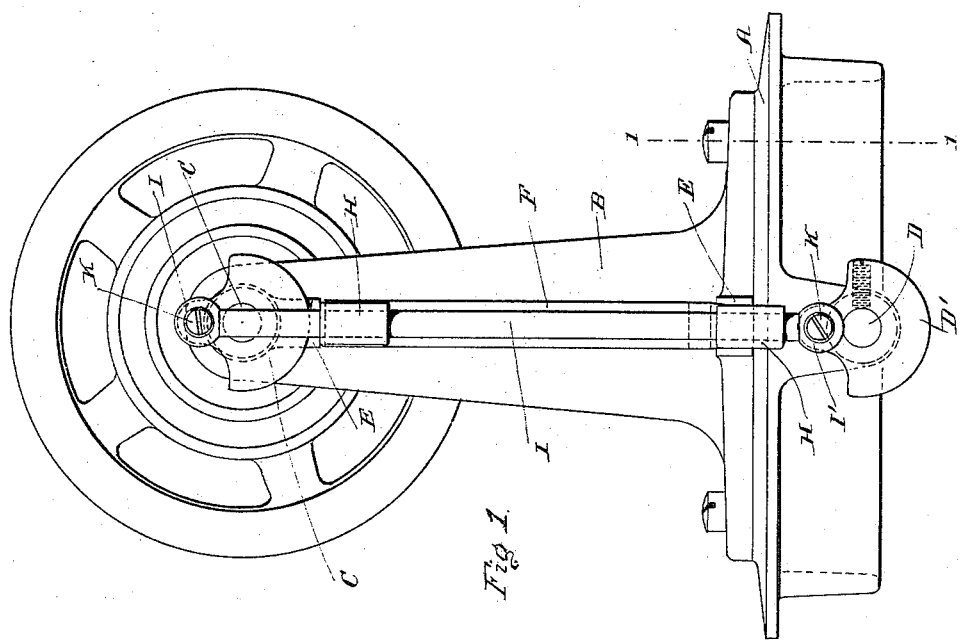
Witnesses,
W. H. Jones
J. P. Wooster
Inventor:
Andrew C. Campbell
By F. M. Wooster
Atty (No Model.)
3 Sheets—Sheet 2.
A. C. CAMPBELL.
MECHANICAL MOVEMENT.
No. 298,943. Patented May 20, 1884.
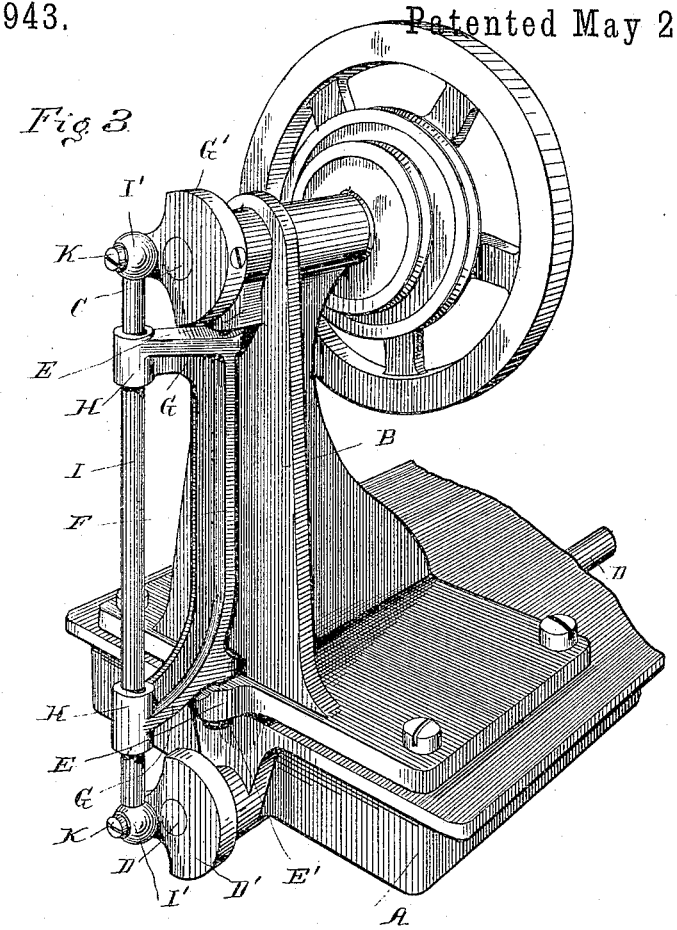
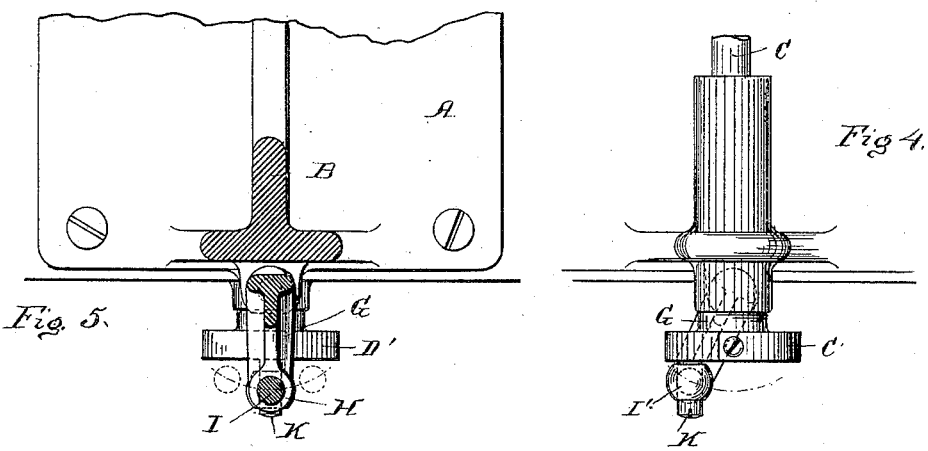
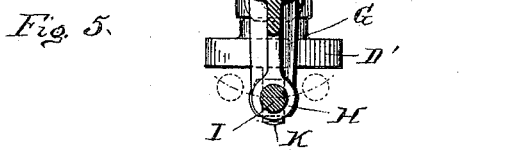
Witnesses
Wm H Jones
J T Wooster
Inventor
Andrew C. Campbell
By A. N. Wooster
atty (No Model.)  3 Sheets—Sheet 3.
A. C. CAMPBELL.
MECHANICAL MOVEMENT.
No. 298,943. Patented May 20, 1884.
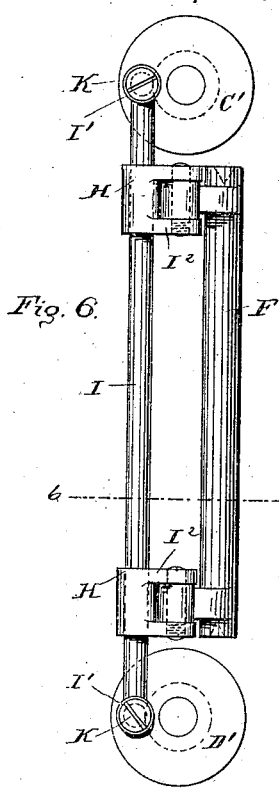
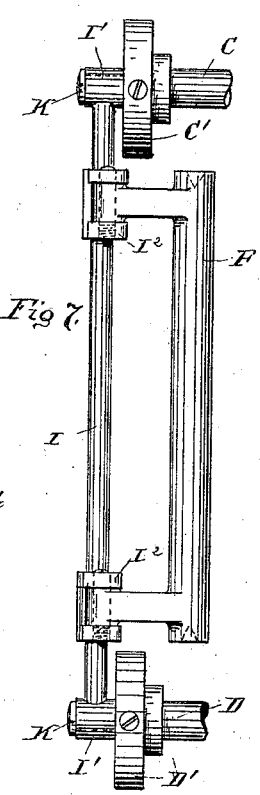
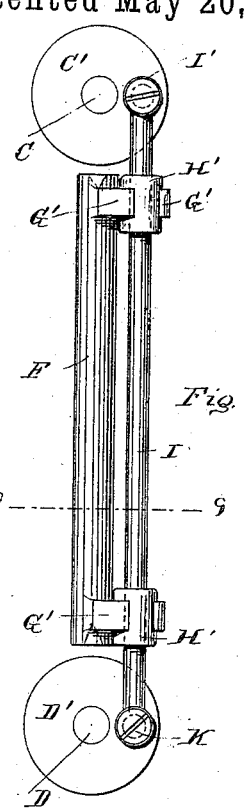
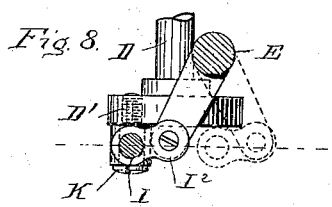
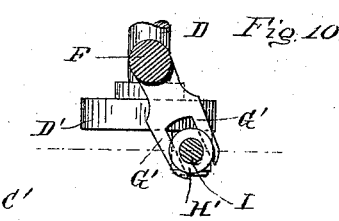
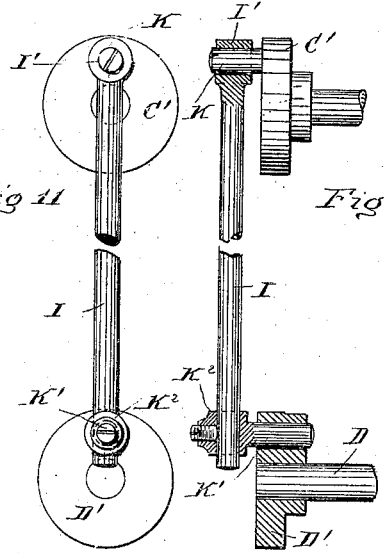
Witnesses.
Wm H Jones
J. T. Wooster
Inventor
Andrew C. Campbell
By J. T. Wooster
Atty
N. PETERS, Photo-Lithographer, Washington, D. C.

UNITED STATES PATENT OFFICE.

ANDREW C. CAMPBELL, OF BRIDGEPORT, CONNECTICUT, ASSIGNOR TO THE WHEELER & WILSON MANUFACTURING COMPANY.

MECHANICAL MOVEMENT.

SPECIFICATION forming part of Letters Patent No. 298,943, dated May 20, 1884.

Application filed March 20, 1884. (No model.)

*To all whom it may concern:*

Be it known that I, ANDREW C. CAMPBELL, a citizen of the United States, residing at Bridgeport, in the county of Fairfield and State of Connecticut, have invented certain new and useful Improvements in Mechanical Movements; and I do hereby declare the following to be a full, clear, and exact description of the invention, such as will enable others skilled in the art to which it appertains to make and use the same.

My invention relates to that class of mechanical movements in which rotary motion is transmitted from one shaft to another, and has for its object to produce a device which shall be simple, economical, and durable, and in which the movements of the shafts shall be isochronous. With this end in view I have devised the novel construction and combination of elements, which I will now proceed to describe and then specifically point out in the claims.

In my specification I shall refer by letters to the accompanying drawings, forming part thereof, in which—

Figure 1 is an end elevation; Fig. 2, a side elevation, partly in section, on the line 1 1; Fig. 3, a perspective of the device complete; Fig. 4, a plan view; Fig. 5, a cross-section on the line 2 2. Figs. 6 and 7 are respectively end and side elevations, and Fig. 8 a cross-section on line 6 6, of a modification. Fig. 9 is an end view of another modification, and Fig. 10 a cross-section thereof on line 9 9, and Figs. 11 and 12 are respectively end and side elevations of still another modification.

Similar letters indicate like parts in all the figures.

A is the base-plate, and B a vertical standard bolted or otherwise secured thereto.

C and D are respectively the upper and lower shafts. I have shown the upper one as the driving-shaft, and the lower one as the driven shaft; but this arrangement is immaterial, as they work equally well when transposed; nor is it necessary that the shafts should be placed on a vertical plane. They may be placed on a horizontal plane or set at any angle.

E E are brackets upon the outer side of the standard, which are provided with bearing-cones E' E', one of which is necessarily screw-threaded.

F is a rock-shaft pivoted on said bearing-cones. This shaft is provided with arms G G, at the outer ends of which are guides H H, in which rod I slides freely in a plane parallel with the axis of the rock-shaft. At the ends of the driving and the driven shafts are crank-disks or plates, which are indicated, respectively, by C' and D'.

K K are pins projecting outward from the plates in a line parallel with the shafts.

At the ends of rod I are enlargements I', through which pins K pass, and which serve as bearings or guides therefor—that is to say, the enlargements on rod I slide freely on said pins. It should be observed that in any position which they can assume a line drawn from center to center of pins K K will be parallel with the axis of the rock-shaft, and that at all times the centers of said pins and the centers of the two shafts are an equal distance apart. In my drawings I have shown pins K K as screwed into plates C' and D', both of which are secured to their respective shafts by set-screws. I have also shown the lower bearing-cone, E, as screwed into its bracket, in order to facilitate the assembling of the parts, and also to enable me to adjust the bearing in the event of any lost motion after long-continued use. If preferred, however, the rock-shaft may be journaled on a rod passing through both brackets.

Further explanation as to the assembling of the parts is believed to be unnecessary. I have shown the driving-shaft as provided with a balance-wheel and belt-pulleys, by means of which power is transmitted from the main or a counter shaft; but it is obvious that rotation may be imparted to the driving-shaft by any other ordinary means. Such means, however, forms no part of my present invention, and therefore requires no further description.

The operation of my invention is as follows: The power being applied, rotary motion is imparted to the driving-shaft and the plate and crank-pin carried thereby. Rod I is carried by the two crank-pins, and is supported in the guides upon the rock-shaft. The enlargements upon the rod are free to slide longitudinally on the pins a distance equal to the versed sine of half the angle of vibration of the rock-shaft. The guides permit free vertical movement of the rod, and also have slight rotary movement upon said rod. As the crank-plate upon the driving-shaft is carried around, rod I, which is carried by the pin in said plate, must move with it. As the guides upon the rock-shaft act to maintain the rod constantly in a vertical position, it will be seen that at each half-rotation of the crank-plate the rock-shaft is moved from one extremity of its arc to the other. Thus, supposing the parts to be in the position shown in Figs. 3 and 4 and the dotted lines at the left in Fig. 5, when the crank-plate has made a quarter-revolution, the rock-shaft will be in the position shown in full lines in Fig. 5, also in Figs. 1 and 2, the enlargement on rod I being then at its farthest distance from the crank-plate. At this position the rod I has ceased to act longitudinally, and all the stress of power applied becomes torsional on the rock-shaft as the rod is being forced in a direction at right angles to its length. The lower end of the rod also receives this direction, owing to the interposed paralleling rock-shaft F. When the half-revolution is completed, the rod will be in the position indicated by dotted lines at the right in Fig. 5, the enlargement on rod I having moved inward upon the pin to its nearest proximity to the crank-plate. During the last half of the revolution of the crank-plate the rock-shaft swings back to the position shown in Figs. 3 and 4. The rotation of the driving-crank plate and the oscillation of the rock-shaft being thus accurately timed, and the crank plates and pins upon the two shafts being identical in construction, it follows that the movements of the driven shaft must be isochronous with the driving-shaft.

It will be observed that the chord of the arc through which the rock-shaft oscillates is just equal to the diameter of the circle in which the crank-pins rotate, and that at the instant rod I is at either of the positions at which a dead-center is possible it is carried by such position by the oscillation of the guides which support it. Thus it will be seen that the oscillatory motion of the rock-shaft and the rotary motion of the crank-plates are so adjusted that each acts to assist the other.

The construction and adjustment of the parts are such that friction is reduced to the minimum, and any appreciable wear and consequent loss of motion is rendered impossible. The bearings of the rock-shaft are cones, and one of them is necessarily adjustable. As rod I is provided with two supporting-guides, any tendency toward twisting or biting upon the rod is prevented. Should wear upon the crank pins or guides take place, the lost motion could be taken up by split bearings, or the crank-pins may be renewed.

I do not desire to limit myself to the exact construction shown, as it is evident that the details of construction may be varied within reasonable limits without departing from the spirit of my invention. For instance, in Figs. 6, 7, and 8 I have illustrated a modification in which rod I has vertical movement, as in the other form; but, instead of an in-and-out movement upon the crank-pins, free rotary movement only is permitted, and the guides, instead of sliding in the arms of the rock-shaft, slide in links $I^2$, which are pivoted to said arms.

In the modification illustrated in Figs. 9 and 10 rod I is secured to the crank-plates, as in the last-described construction; but, instead of links, the ends of arms G G are forked, forming pairs of arms $G'$ $G'$, between which the guides $H'$ $H'$, which support rod I, slide freely. (See Fig. 10.)

In Figs. 11 and 12 I have illustrated still another modification, in which the upper enlargement, $I'$, of rod I slides upon a pin, K, as in the preferred form. At the bottom, however, rod I has no enlargement, but is secured by a set-screw in an enlargement, $K^2$, upon a pin, $K'$, the pin itself sliding freely in and out in the crank-plate.

It will be apparent that the principles of operation herein explained are not necessarily restricted in their application to a single driven shaft. I may use two or any reasonable number of driven shafts—as, for example, in driving a series of spindles. For convenience only in description and illustration I have referred to but one driven shaft.

I claim—

1. As a means for transmitting isochronous rotary movement, a rod pivoted to crank-plates upon a driving and a driven shaft, said rod being supported by guides upon a rock-shaft, said shaft and rod being so adjusted that the rock-shaft acts to assist the rod at the points where a dead-center is otherwise possible.

2. The combination, with a rod and crank-pins which pivotally connect the same to disks upon a driving and a driven shaft, of oscillating guides which support said rod, as described, and for the purpose set forth.

3. A driving-shaft and a driven shaft having plates at their ends carrying crank-pins, and a rod carried by said pins and sliding freely thereon, in combination with a rock-shaft having guides which support said rod, substantially as described.

4. A rock-shaft having arms, at the outer ends of which are guides, and a sliding rod supported in said guides, in combination with rotating crank-pins which carry said rod, whereby the movement of the driving-shaft is transmitted to the driven.

5. In a mechanical movement, guides H, which oscillate in an arc and support rod I, in combination with crank-pins which carry rod I, and which move in a circle whose diameter is equal to the chord of the arc described by the oscillations of guides H, as described, and for the purpose set forth.

6. A rod connecting two shafts and carried by crank-pins at the ends of said shafts, in combination with guides upon a rock-shaft, which support said rod and oscillate in an arc, said rock-shaft and rod being parallel, and the centers of the crank-pins and of the shafts being an equal distance apart.

In testimony whereof I affix my signature in presence of two witnesses.

ANDREW C. CAMPBELL.

Witnesses:
A. M. WOOSTER,
A. B. FAIRCHILD.